US010175954B2

(12) United States Patent
Lee et al.

(10) Patent No.: US 10,175,954 B2
(45) Date of Patent: Jan. 8, 2019

(54) METHOD OF PROCESSING BIG DATA, INCLUDING ARRANGING ICONS IN A WORKFLOW GUI BY A USER, CHECKING PROCESS AVAILABILITY AND SYNTAX, CONVERTING THE WORKFLOW INTO EXECUTION CODE, MONITORING THE WORKFLOW, AND DISPLAYING ASSOCIATED INFORMATION

(71) Applicant: LG CNS CO., LTD., Seoul (KR)

(72) Inventors: Joo Youl Lee, Seoul (KR); Hyun Sang Kang, Seoul (KR); Ki Do Kim, Seoul (KR); Seok Keun Oh, Seoul (KR); Jong Won Park, Seoul (KR); Don Jung Choi, Seoul (KR)

(73) Assignee: LG CNS CO., LTD., Seoul (KR)

( * ) Notice: Subject to any disclaimer, the term of this patent is extended or adjusted under 35 U.S.C. 154(b) by 281 days.

(21) Appl. No.: 14/495,455

(22) Filed: Sep. 24, 2014

(65) Prior Publication Data
US 2015/0089415 A1 Mar. 26, 2015

(30) Foreign Application Priority Data
Sep. 24, 2013 (KR) .......................... 10-2013-0113502

(51) Int. Cl.
*G06F 8/34* (2018.01)
*G06Q 10/06* (2012.01)
(52) U.S. Cl.
CPC ........... *G06F 8/34* (2013.01); *G06Q 10/0633* (2013.01)

(58) Field of Classification Search
CPC ............................. G06F 8/34; G06Q 10/0633
See application file for complete search history.

(56) References Cited

U.S. PATENT DOCUMENTS 6,243,092 B1 * 6/2001 Okita ..................... G06F 8/34
700/83
8,621,421 B2 * 12/2013 Klaka ................ G06Q 10/06
717/101

(Continued)

FOREIGN PATENT DOCUMENTS

JP 2004-303115 A 10/2004
KR 10-2012-0085400 A 8/2012

(Continued)

OTHER PUBLICATIONS

Korean Office Action issued in application No. 10-2013-0113502 dated Jan. 19, 2015.

*Primary Examiner* — Abdullah Al Kawsar
*Assistant Examiner* — Jeremy L Stanley
(74) *Attorney, Agent, or Firm* — KED & Associates, LLP

(57) ABSTRACT

Provided is a method of processing a big data which may include arranging a plurality of action icons from a palette and a plurality of flow icons representing a non-cyclic order for the plurality of the action icons to generate a workflow, checking a syntax for the plurality of the arranged action icons and the plurality of the flow icons, the syntax being dependent on a corresponding action icon and graphically generating an alarm badge indicating a syntax error for a specific icon when the syntax error for the specific icon is found. Therefore, the method and apparatus may use a Hadoop framework to effectively manage a workflow for processing irregular big data.

13 Claims, 11 Drawing Sheets

(56) References Cited

U.S. PATENT DOCUMENTS

| | | | |
|---|---|---|---|
| 8,856,291 B2* | 10/2014 | Bartlett | G06Q 10/0633 705/301 |
| 2004/0088208 A1* | 5/2004 | Runge | G06Q 10/0633 705/7.31 |
| 2006/0074736 A1* | 4/2006 | Shukla | G06Q 10/06 717/100 |
| 2006/0092467 A1* | 5/2006 | Dumitrescu | H04N 1/00278 358/1.15 |
| 2007/0040094 A1* | 2/2007 | Smith | G06K 9/6253 250/202 |
| 2007/0101287 A1* | 5/2007 | Pagan | G06F 3/048 715/781 |
| 2009/0070162 A1* | 3/2009 | Leonelli | G06Q 10/0633 705/7.27 |
| 2009/0276771 A1* | 11/2009 | Nickolov | G06F 9/4856 717/177 |
| 2011/0276789 A1* | 11/2011 | Chambers | G06F 9/445 712/220 |
| 2013/0073334 A1* | 3/2013 | Favre | G06Q 10/0633 705/7.27 |
| 2013/0073724 A1* | 3/2013 | Parashar | G06F 9/5072 709/224 |
| 2013/0086116 A1* | 4/2013 | Agarwal | G06F 7/00 707/792 |
| 2013/0204948 A1* | 8/2013 | Zeyliger | G06F 9/44505 709/206 |
| 2013/0254196 A1* | 9/2013 | Babu | G06F 17/30595 707/736 |
| 2013/0318277 A1* | 11/2013 | Dalal | G06F 13/1652 710/308 |
| 2014/0047342 A1* | 2/2014 | Breternitz | G06F 9/5061 715/735 |
| 2014/0047422 A1* | 2/2014 | Ravi | G06F 8/443 717/151 |
| 2014/0074850 A1* | 3/2014 | Noel | G06F 9/542 707/741 |
| 2014/0101092 A1* | 4/2014 | Simitsis | G06F 17/30398 707/602 |
| 2014/0101093 A1* | 4/2014 | Lanphear | G06F 17/30563 707/602 |
| 2014/0173618 A1* | 6/2014 | Neuman | G06F 9/5066 718/104 |
| 2014/0214763 A1* | 7/2014 | Haas | G06F 17/30581 707/634 |
| 2014/0215487 A1* | 7/2014 | Cherkasova | G06F 9/5083 718/106 |
| 2014/0280766 A1* | 9/2014 | Banerjee | H04L 65/60 709/219 |
| 2014/0282605 A1* | 9/2014 | Jacobson | G06F 9/461 718/107 |
| 2014/0358844 A1* | 12/2014 | Mundlapudi | G06F 17/30563 707/602 |

FOREIGN PATENT DOCUMENTS

| | | |
|---|---|---|
| KR | 10-1218087 B1 | 1/2013 |
| WO | WO 2012/116449 A1 | 9/2012 |

* cited by examiner

METHOD OF PROCESSING BIG DATA, INCLUDING ARRANGING ICONS IN A WORKFLOW GUI BY A USER, CHECKING PROCESS AVAILABILITY AND SYNTAX, CONVERTING THE WORKFLOW INTO EXECUTION CODE, MONITORING THE WORKFLOW, AND DISPLAYING ASSOCIATED INFORMATION

CROSS-REFERENCE TO RELATED APPLICATION

This application claims priority under 35 U.S.C. § 119 to Korean Application No. 10-2013-0113502 filed on Sep. 24, 2013, whose entire disclosure is hereby incorporated by reference.

BACKGROUND

1. Field

Embodiments may relate to big data processing technology and more particularly to a method of processing big data, an apparatus performing the same and a storage media storing the same to effectively manage a workflow for processing irregular big data.

2. Background

Methods of processing big data, an apparatus performing the same and a storage media storing the same are known. However, they suffer from various disadvantages.

BRIEF DESCRIPTION OF THE DRAWINGS

The embodiments will be described in detail with reference to the following drawings in which like reference numerals refer to like elements wherein.

DETAILED DESCRIPTION

Figure 1:
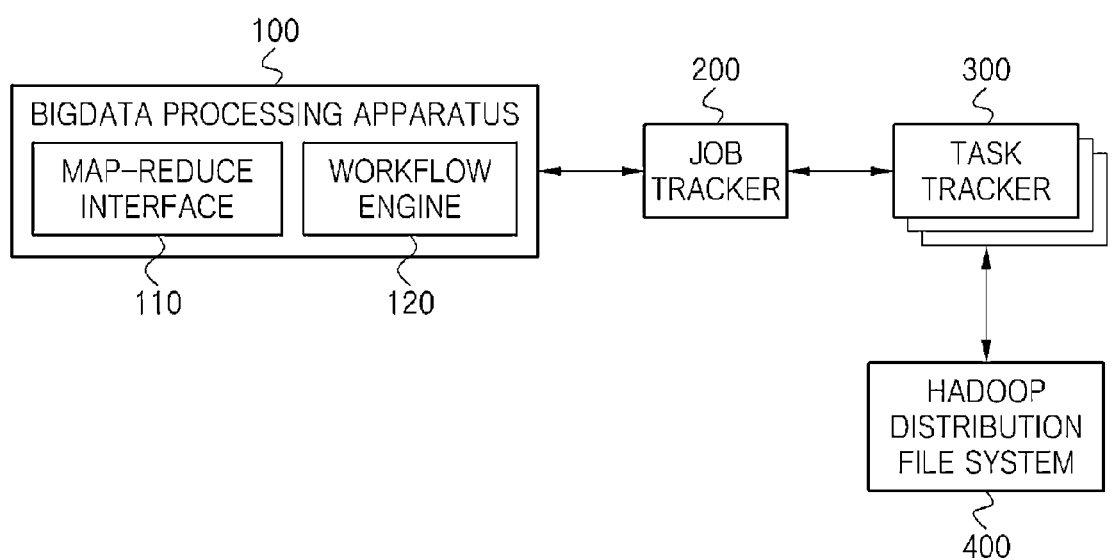
FIG. 1 is a block diagram of a big data processing system.

Explanation of the present disclosure is merely an embodiment for structural or functional explanation, so the scope of the present disclosure should not be construed to be limited to the embodiments explained in the embodiment. That is, since the embodiments may be implemented in several forms without departing from the characteristics thereof, it should also be understood that the described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Terms described in the present disclosure may be understood as follows.

While terms such as "first" and "second," etc., may be used to describe various components, such components must not be understood as being limited to the above terms. The above terms are used to distinguish one component from another. For example, a first component may be referred to as a second component without departing from the scope of rights of the present disclosure, and likewise a second component may be referred to as a first component.

The term "and/or" should be understood as including all of combination that can be made from one or more relevant items. For example, the term "the first item, the second item, and/or the third item" means not only the first, the second, or the third item, but the combination of all of items that can be made from two or more of the first, second, or third items.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "between", "immediately between" or "adjacent to" and "directly adjacent to" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective steps or operations are used for the sake of explanation and do not describe any particular order. The respective operations may be changed from a mentioned order unless specifically mentioned in context. Namely, respective steps may be performed in the same order as described, may be substantially simultaneously performed, or may be performed in reverse order.

The present disclosure may be implemented as machine-readable codes on a machine-readable medium. The machine-readable medium includes any type of recording device for storing machine-readable data. Examples of the machine-readable recording medium include a read-only memory (ROM), a random access memory (RAM), a compact disk-read only memory (CD-ROM), a magnetic tape, a floppy disk, and optical data storage. The medium may also be carrier waves (e.g., Internet transmission). The computer-readable recording medium may be distributed among networked machine systems which store and execute machine-readable codes in a de-centralized manner.

The terms used in the present application are merely used to describe particular embodiments, and are not intended to limit the present disclosure. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present application.

A big data includes any collection of data sets which are very large and complex, and hence, difficult to process using traditional data processing. Big data is generated in a digital environment and corresponds to a large-scale data including numeral value data and letter and image data and a size of the big data and a size of the big data is enormous. A HADOOP is a JAVA based platform supporting a distribution program for processing the big data. The HADOOP includes a HDFS (HADOOP Distributed File System) and the distributed-stored data is processed through a map-reduce in parallel.

Korean Patent Registration No. 10-1218087 discloses an input format extraction method for binary data analysis in a HADOOP map-reduce and an analysis method for binary data using the same. In the binary data analysis method, when the binary data with a fixed length is distribution-processed in HADOOP environment, the binary data may be processed without a data format conversion process thereby a relatively small storage space is required and a processing time may be shortened.

Korean Patent Publication No. 10-2012-0085400 discloses a packet analysis system using a HADOOP based parallel arithmetic and method thereof capable of reducing packet processing costs. The packet analysis method performs the packet analysis by the parallel arithmetic on a plurality of servers so that the packet analysis method may not require a high cost server and reduce a processing cost.

Provided herein is an improved method of processing big data, an apparatus performing the same and a storage device for storing the same. As broadly described and embodied herein, the method may include a method of processing a big data capable of using a HADOOP to effectively manage a workflow for processing irregular big data.

Embodiments may provide a method of processing big data capable of providing an alarm badge according to a syntax error of a metadata being provided for generating a workflow.

Embodiments may provide a method of processing big data capable of providing a completion time of a map-reduce process by polling for an action icon execution from a job tracker.

FIG. 1 is a block diagram of a big data processing system. A big data process system may include a big data processing apparatus 100, a job tracker 200, a test tracker 300 and a HADOOP distribution file system 400.

The big data processing apparatus 100 may arrange an action icon and a flow icon on a canvas for processing a big data by a map-reduce interface 110 to generate a workflow and may store the generated workflow in the HADOOP distribution file system 400.

In at least one embodiment, the big data processing apparatus 100 may input a JAR (JAVA Archiver) file including a map-reduce code for a workflow and at least one of input-output data location into the job tracker 200 to request an execution of the workflow.

The big data processing apparatus 100 may automatically receive a data processing progress status from the job tracker 200. Herein, the big data processing apparatus 100 may store a result of a map-reduce process for the workflow causing the execution to be completed in the HADOOP distribution file system 400.

The job tracker 200 may receive the JAR (JAVA Archiver) file including a map-reduce code for a workflow and the at least one of input-output data location from the big data processing apparatus 100 to divide into a small unit and to assign to at least one task tracker 300.

The task tracker 300 may process a map-reduce in parallel based on information for the workflow received from the job tracker 200. Herein, the task tracker 300 may report the data process progress status of the job tracker 200 at a predetermined time.

The HADOOP distribution file system 400 may store the result of the map-reduce process causing the execution to be completed in the job tracker 200.

Figure 2:
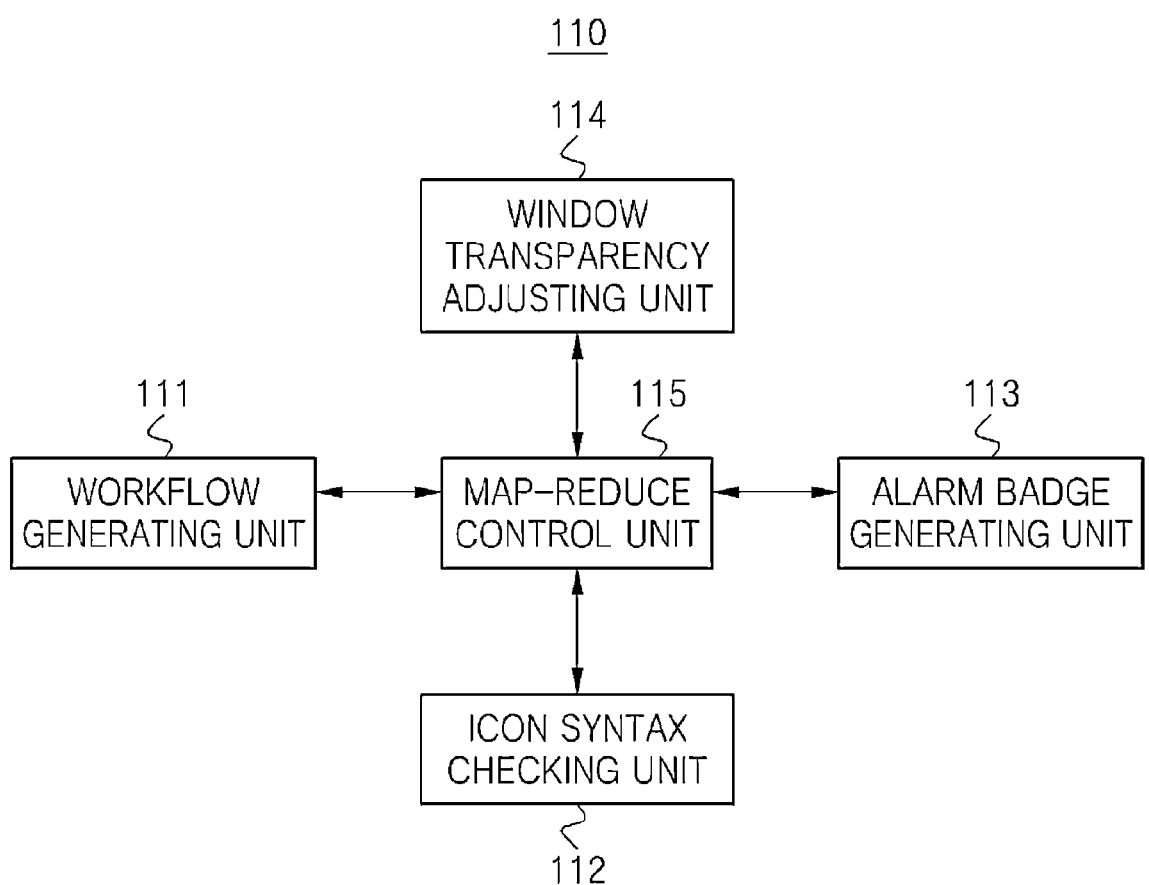
FIG. 2 is a block diagram of a map-reduce interface of an apparatus of processing big data in FIG. 1.

FIG. 2 is a block diagram of a map-reduce interface of an apparatus of processing a big data in FIG. 1. The map-reduce interface 110 may include a workflow generating unit 111, an icon syntax checking unit 112, an alarm badge generating unit 113, a window transparency adjusting unit 114 and a map-reduce control unit 115.

The workflow generating unit 111 may arrange a plurality of action icons and a plurality of flow icons representing a non-cyclic order for the plurality of the action icons on a palette to generate the workflow.

Figure 5:
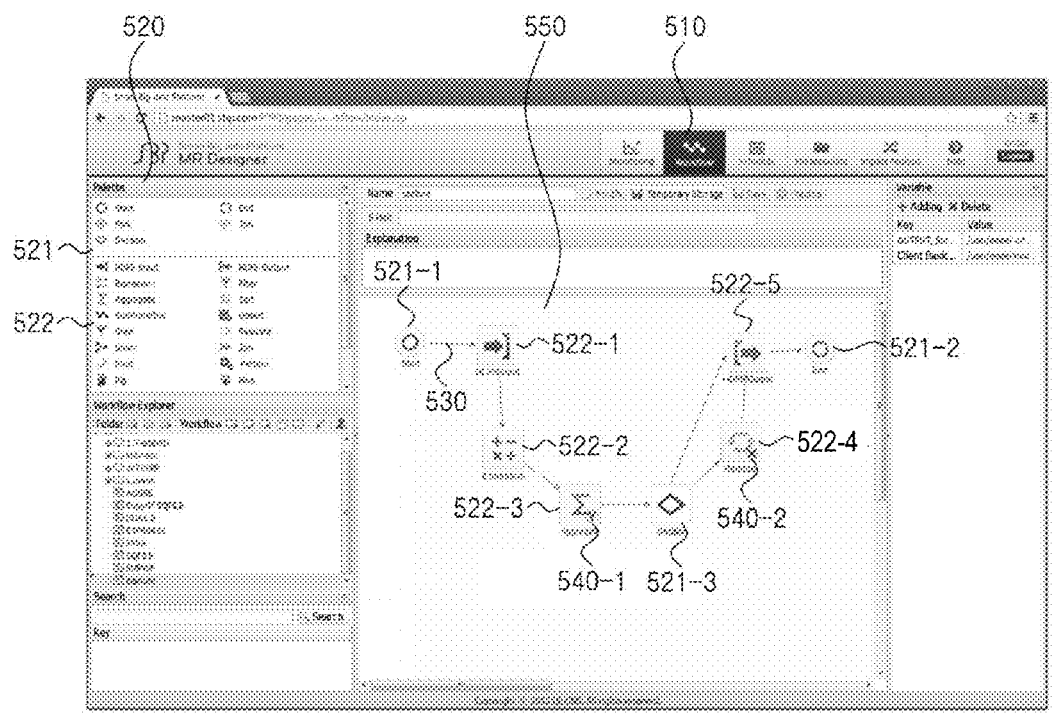
FIG. 5 is a diagram showing a workflow design screen of the apparatus of processing the big data in FIG. 1.

In at least one embodiment, for example in FIG. 5, the workflow generating unit 111 may arrange first action icons 521 respectively including a flow process work (herein, the flow process work may correspond to an operation being provided from the big data processing apparatus 100 irrelevant to a HADOOP) in the plurality of the action icons and second action icons 522 respectively including a big data process work (herein, the big data process work may correspond to HADOOP based operation) on the canvas 550 through a workflow screen 510 in the palette 52.

In at least one embodiment, the workflow generating unit 111 may check a sequential process availability for a pair of action icons when a specific flow icon between the pair of the action icons is arranged. For example, in FIG. 5, the workflow generating unit 111 may refuse the sequential process availability between a Start action icon 521-1 and a HDFSOutput action icon 522-5 when the flow icon 530 between the Start action icon 521-1 and the HDFSOutput action icon 522-5 is arranged. Herein, because the workflow generating unit 111 may sequentially process the workflow only when a HDFSInput action icon 522-1 exists before the HDFSOutput action icon 522-5, the workflow generating unit 111 may refuse the sequential process availability between the Start action icon 521-1 and the HDFSOutput action icon 522-5 without the HDFSInput action icon 522-1.

In at least another embodiment, the workflow generating unit 111 may check a number of the flow icon for a specific action icon when the flow icon for the specific action icon is arranged. For example, referring again to FIG. 5, the workflow generating unit 111 may check the number of the flow icon 530 for a Decision action icon 521-3 included in the first action icons 521. When the number of the flow icon 530 is 2, the workflow generating unit 111 may determine that the sequential process is possible and when the number of the flow icon 530 is not 2, the workflow generating unit 111 may determine that the sequential process is impossible.

The workflow generating unit 111 may set a metadata for the specific action icon in an icon window when the specific action icon in the workflow is selected. Herein, processing the big data may refer to the set metadata.

Figure 6A:
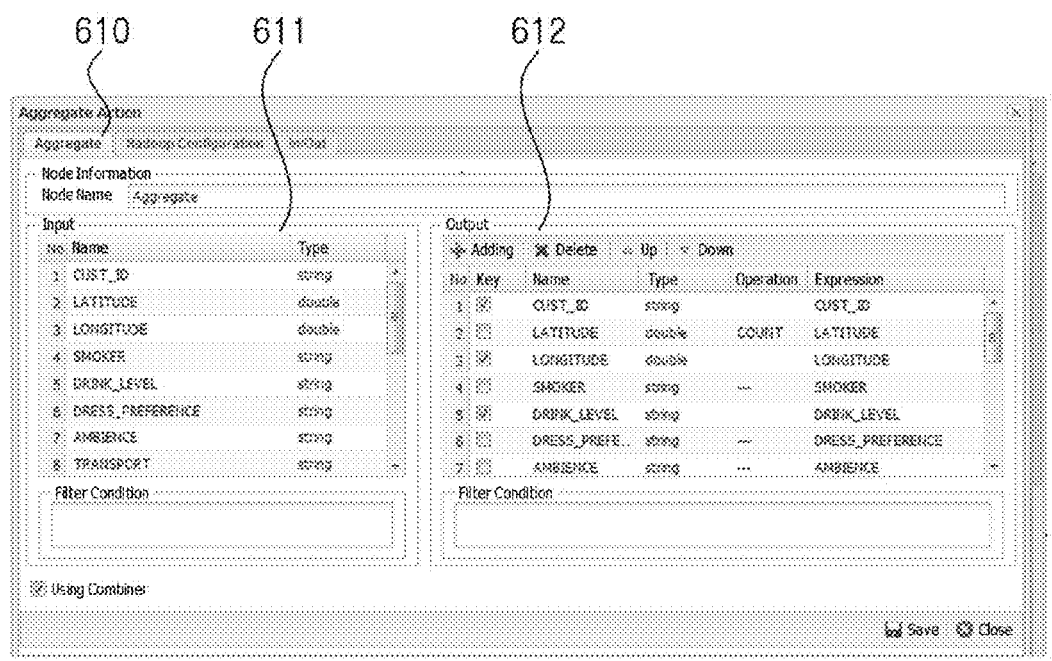
FIGS. 6A to 6C are diagrams showing an icon window performed on the workflow design screen of the apparatus of processing the big data in FIG. 1.

In at least one embodiment, the workflow generating unit 111 may receive information of an output metadata for an input metadata being provided at the icon window when the specific action icon is selected. For example, in FIG. 6A, when the Aggregate action icon is selected, the workflow generating unit 111 may provide the input metadata 611 at an Aggregate tab 610 of the icon window for setting a map-reduce input parameter for an Aggregate action icon to receive an operation, expression and execution sequence for the output metadata 612.

Figure 6B:
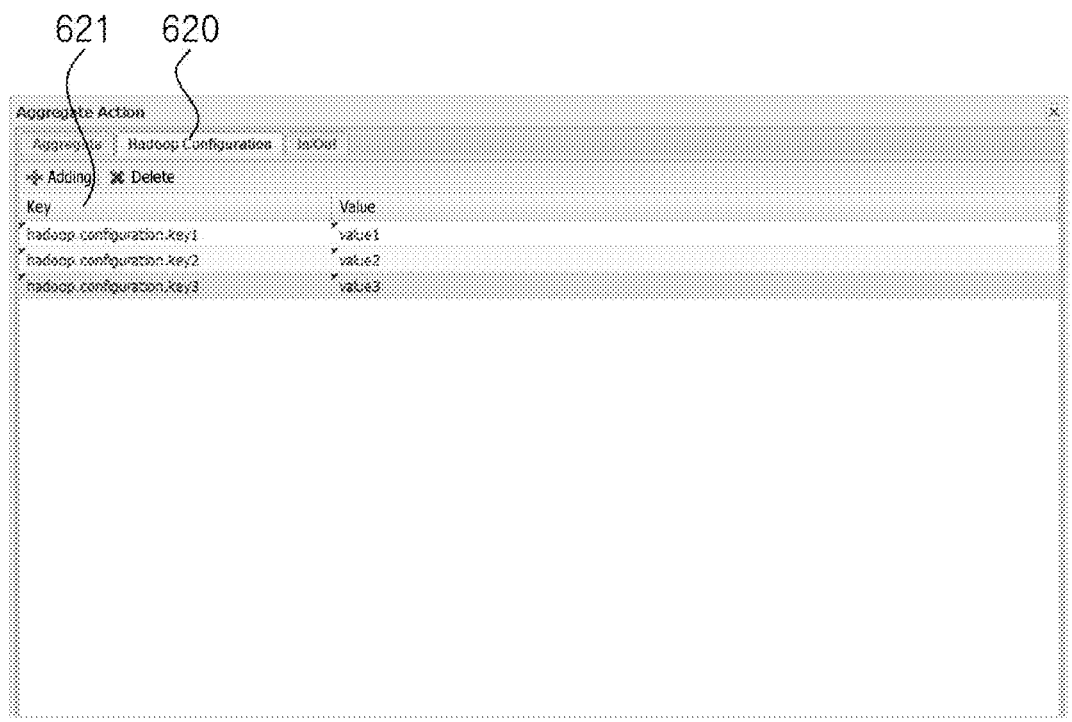

The workflow generating unit 111 may receive HADOOP setting parameter associated with a map-reduce operation for the specific action icon. For example, in FIG. 6B, when the Aggregate action icon is selected, the workflow generating unit 111 may receive a key 621 and value for setting an operation mode of the map-reduce work from a HADOOP Configuration tab 620 of the icon window. Herein, the key 621 may use a name defined on a HADOOP.

Figure 6C:
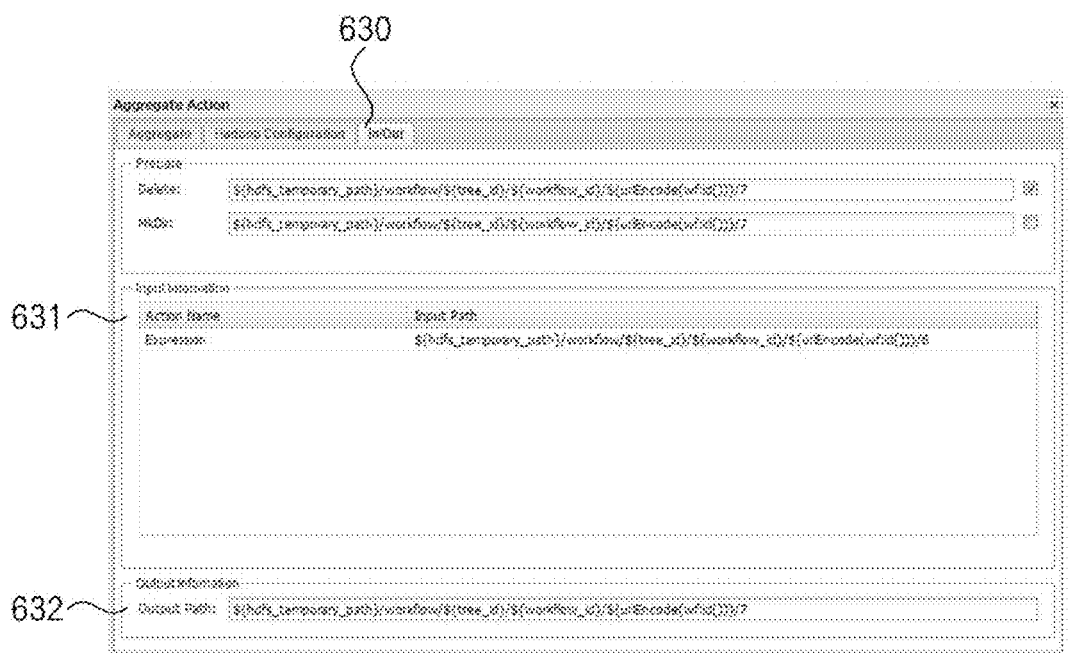

The workflow generating unit 111 may set an input-output location of HADOOP distribution storage associated with the map-reduce work for the specific action icon. For example, in FIG. 6C, when the Aggregate action icon is selected, the workflow generating unit 111 may receive a name of the specific action icon (e.g., Expression) and an input location of HADOOP distribution storage being received as input information 631 for setting an input-output directory of the map-reduce work on at In/Out tab 630 of the icon window and may receive an output location of HADOOP distribution storage as output information 632.

The icon syntax checking unit 112 may check a syntax for the plurality of the arranged action icons and the plurality of the flow icons, each being dependent on a corresponding action icon.

In at least one embodiment, the icon syntax checking unit 112 may check whether an execution procedure being used in the plurality of the arranged action icons and dependent flow icons thereof is defined or available. For example, the execution procedure may correspond to the output metadata 612 in FIG. 6A and the icon syntax checking unit 112 may check whether this execution procedure is available and may check the operation and expression for the output metadata 612 in FIG. 6A.

The alarm badge generating unit 113 may graphically generate an alarm badge indicating a syntax error for a specific icon when the syntax error for the specific icon is found. In at least one embodiment, the alarm badge generating unit 113 may determine a type of the syntax error for the specific icon to determine the alarm badge corresponding to the type of the syntax error. For example, in FIG. 5, when the syntax error inputted in the Aggregate action icon 522-3 is found (e.g., the syntax error may correspond to at least one of a typing error and a value being not included in a manual), the alarm badge generating unit 113 may generate a prescribed alarm badge 540-1 (e.g., an image of a circle with a letter 'v') at a lower right side of the Aggregate action icon 522-3 and when the syntax is not inputted at a syntax input item of a Relocate action icon 522-4, the alarm badge generating unit 113 may generate another prescribed alarm badge 540-2 (e.g., an image of a circle with the letter 'x') at a lower right side of the Relocate action icon 522-3.

When the syntax error is found, the alarm badge generating unit 113 may graphically generate a color different to an icon reference color of the specific icon for indicating the syntax error for the specific icon. For example, when the syntax error (e.g., the syntax error may correspond to the at least one the typing error and the value being not included in the manual) is found, the alarm badge generating unit 113 may generate an orange color different to the icon reference color of the specific icon (e.g., a white color) and when the syntax is not inputted at the specific icon, the alarm badge generating unit 113 may generate an red color different to the icon reference color of the specific icon (e.g., a white color).

The window transparency adjusting unit 114 may adjust a transparency for the icon window according to a movement speed of the icon window popped up for the specific icon. In at least one embodiment, when the movement speed of the icon window popped up for the specific icon is slow, the window transparency adjusting unit 114 may increase the transparency for the icon window. Herein, the window transparency adjusting unit 114 may increase the transparency for the icon window so that the action icon and flow icon located behind the icon window may be seen.

In at least another embodiment, when the movement speed of the icon window popped up for the specific icon is fast, the window transparency adjusting unit 114 may decrease the transparency for the icon window.

The map-reduce control unit 115 may control overall operation of the map-reduce interface 110 and may control a control flow or data flow of the workflow generating unit 111, icon syntax checking unit 112, alarm badge generating unit 113, and window transparency adjusting unit 114.

Figure 3:
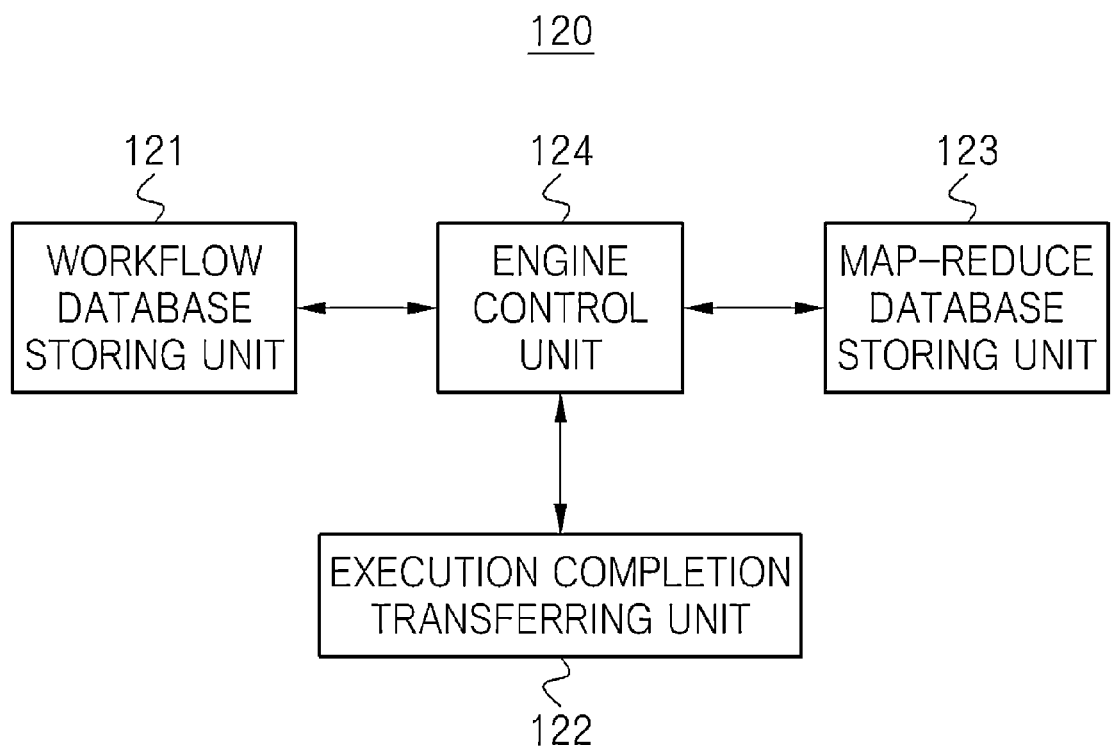
FIG. 3 is a block diagram of a workflow engine of the apparatus of processing the big data in FIG. 1.

FIG. 3 is a block diagram of a workflow engine of the apparatus of processing the big data in FIG. 1. The workflow engine 120 may include a workflow database storing unit 121, an execution completion transferring unit 122, a map-reduce database storing unit 123 and an engine control unit 124.

The workflow database storing unit 121 may store the workflow when a syntax check for the workflow generated on the map-reduce interface 110 is complete. In at least one embodiment, when the syntax check and a syntax modification for the workflow is completed at the map-reduce interface 110, the workflow database storing unit 121 may store a workflow definition document and a name, generation date or path for the workflow as a table.

The execution completion transferring unit 122 may analyze a generated workflow to determine the action icon, transfer a map-reduce of the determined action icon to the job tracker and receive whether the execution for the determined action icon is completed.

The map-reduce database storing unit 123 may store the metadata for the result of a corresponding map-reduce process when the map-reduce process for the specific action icon is completed.

The engine control unit 124 may control overall operation of the workflow engine 120 and may control a control flow or data flow of the workflow database storing unit 121, execution completion transferring unit 122 and map-reduce database storing unit 123.

Figure 4:
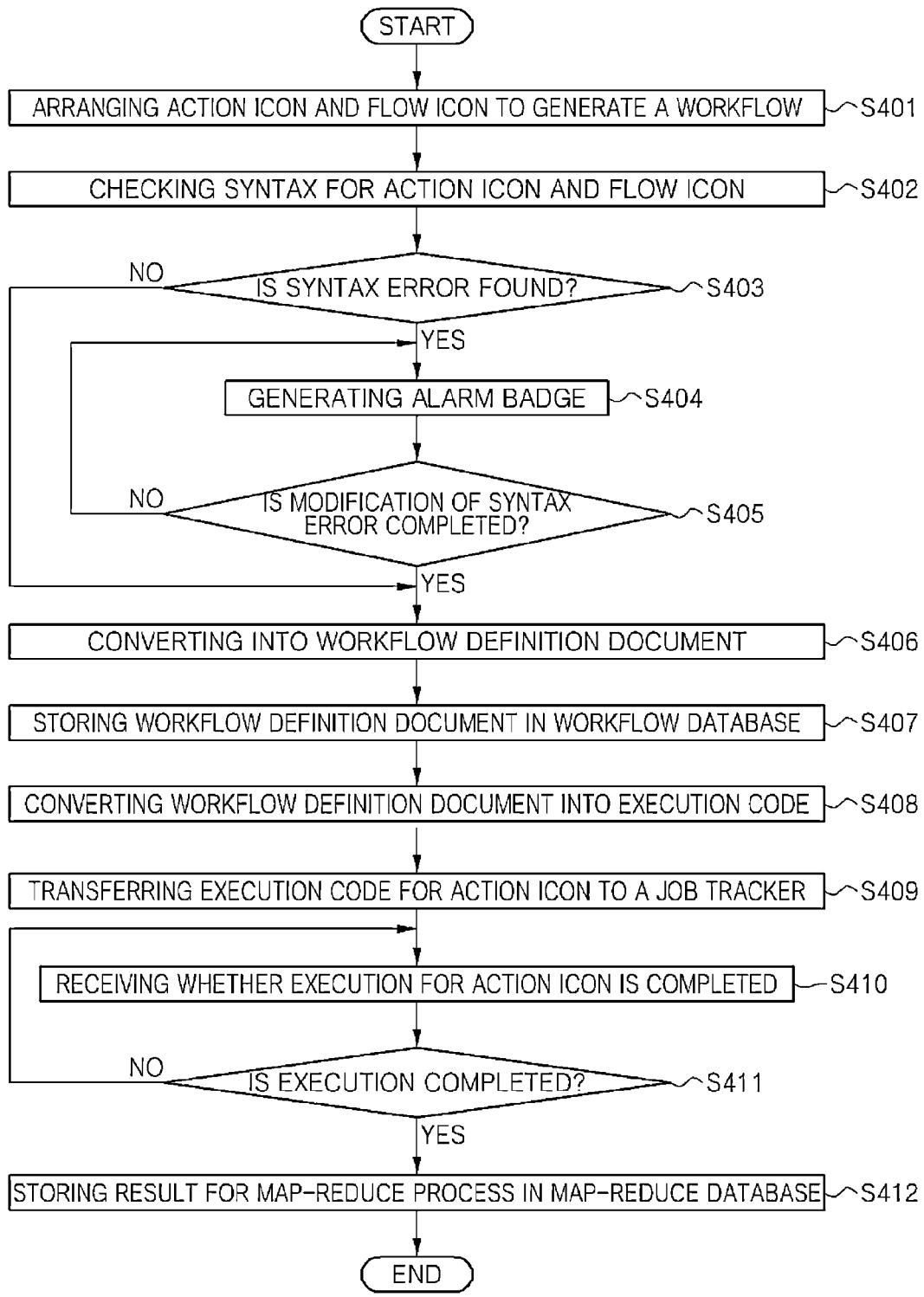
FIG. 4 is a flow chart showing a procedure of processing the big data performed on the apparatus of processing the big data in FIG. 1.

FIG. 4 is a flow chart showing a procedure processing the big data performed on the apparatus of processing the big data in FIG. 1. The workflow generating unit 111 may arrange the plurality of the action icons and the plurality of the flow icons representing the non-cyclic order for the plurality of the action icons on the palette to generate the workflow (Step S401).

In at least one embodiment, referring to FIG. 5, the workflow generating unit 111 may arrange first action icons 521 respectively including a flow process work in the plurality of the action icons and second action icons 522 respectively including a big data process work on the canvas 550 in the palette 520. For example, in FIG. 5, the workflow generating unit 111 may arrange a Start action icon 521-1 and End action icon 521-2 included in the first action icons 521 on the canvas 550 to set a start and end of the workflow. The workflow generating unit 111 may sequentially arrange a HDFSInput action icon 522-1, Expression action icon 522-2, Aggregate action icon 522-3, Decision action icon 521-3, Relocate action icon 522-4 and HDFSOutput action icon 522-5 on the canvas 550 between the Start action icon 521-1 and End action icon 521-2 arranged on the canvas 550 to link the first and second action icons 521-1, 522-2, 522-3, 521-3, 522-4, 522-5 and 521-1 through the non-cyclic flow icon 530.

In at least one embodiment, when the specific action icon in the workflow is selected, the workflow generating unit 111 may provide the metadata for the specific action icon at the icon window to store a sequential execution procedure for the metadata.

In at least another embodiment, the workflow generating unit 111 may receive the HADOOP setting parameter associated with the map-reduce work for the specific action icon.

In at least the other embodiment, the workflow generating unit 111 may set the input-output location of HADOOP distribution storage associated with the map-reduce work for the specific action icon.

The icon syntax checking unit 112 may check a syntax for the plurality of the arranged action icons and the plurality of the flow icons, each being dependent on a corresponding action icon (Step S402).

The alarm badge generating unit 113 may generate the alarm badge indicating the syntax error for the specific icon when the syntax error for the specific icon is found (Steps S403 and S404).

The icon syntax checking unit 112 may check whether a modification for the syntax error generated on the specific icon to transfer a completion message to the workflow database storing unit 121 when the modification is completed and to continuously generate the alarm badge on the alarm badge generating unit 113 when the modification is not completed (Steps S404 and S405).

The workflow database storing unit 121 may convert the corresponding workflow into the workflow definition document when the syntax check for the workflow generated in the map-reduce interface 110 is completed to store the workflow definition document in the database (Steps S406 and S407).

The engine control unit 124 may convert the workflow definition document received in the workflow database storing unit 121 into an execution code (Step S408).

The execution completion transferring unit 122 may analyze the execution code to determine the action icon and transfer the determined action icon to the job tracker and to receive whether the execution for the action icon is completed (Steps S409 and S410).

The map-reduce database storing unit 123 may store the metadata for the result of the corresponding map-reduce process when the map-reduce process for the specific action icon is completed (Steps S411 and S412).

Figure 7:
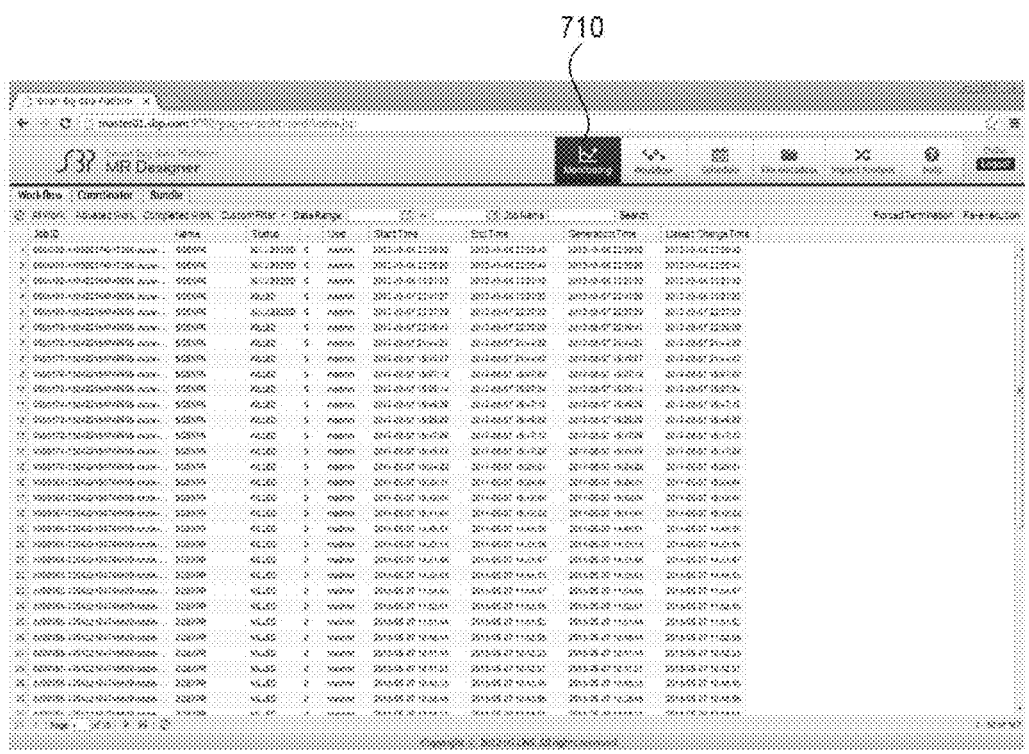
FIG. 7 is a diagram showing a work monitoring menu of the apparatus of processing the big data in FIG. 1.

Meanwhile, the big data processing apparatus 100 may provide process work information the workflow generated through a work monitoring menu included in a workflow work environment. For example, in FIG. 7, the big data processing apparatus 100 may provide at least one of an ID, status (e.g., SUCCEEDED/KILLED), start time, end time, generation time or latest change time for the workflow generated through a work monitoring menu 710.

Figure 8:
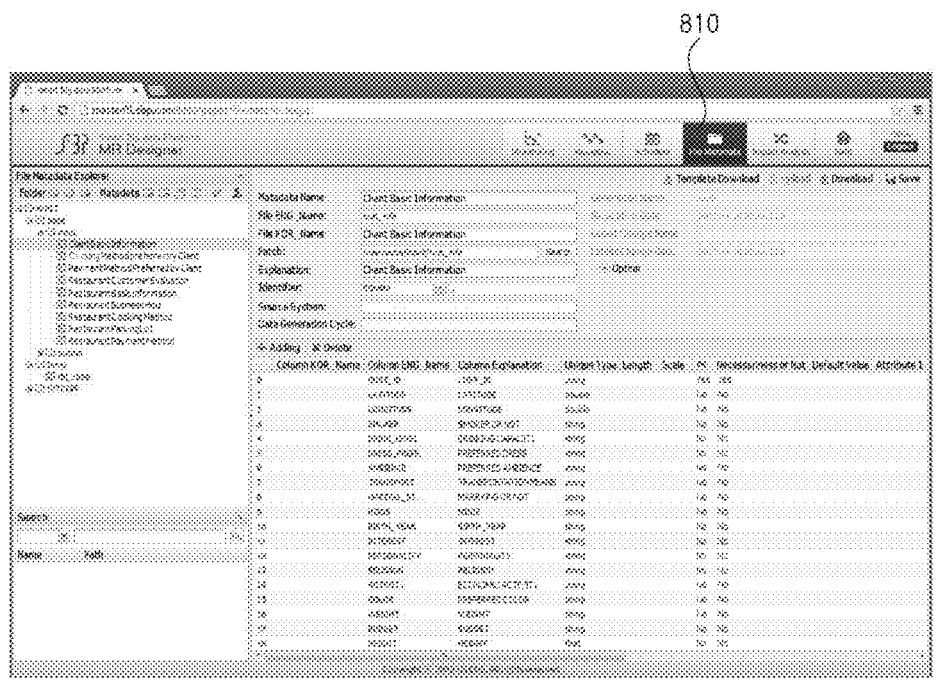
FIG. 8 is a diagram showing a file metadata menu of the apparatus of processing the big data in FIG. 1.

The big data processing apparatus 100 may define the metadata for generating the workflow for the plurality of the action icon in the file metadata menu included in the workflow work environment. For example, in FIG. 8, the big data processing apparatus 100 may define an attribute value (e.g., a column English name, distinct type or whether a primary key is included) for the metadata of the big data being processed by the action icon through the file metadata menu 810.

Figure 9:
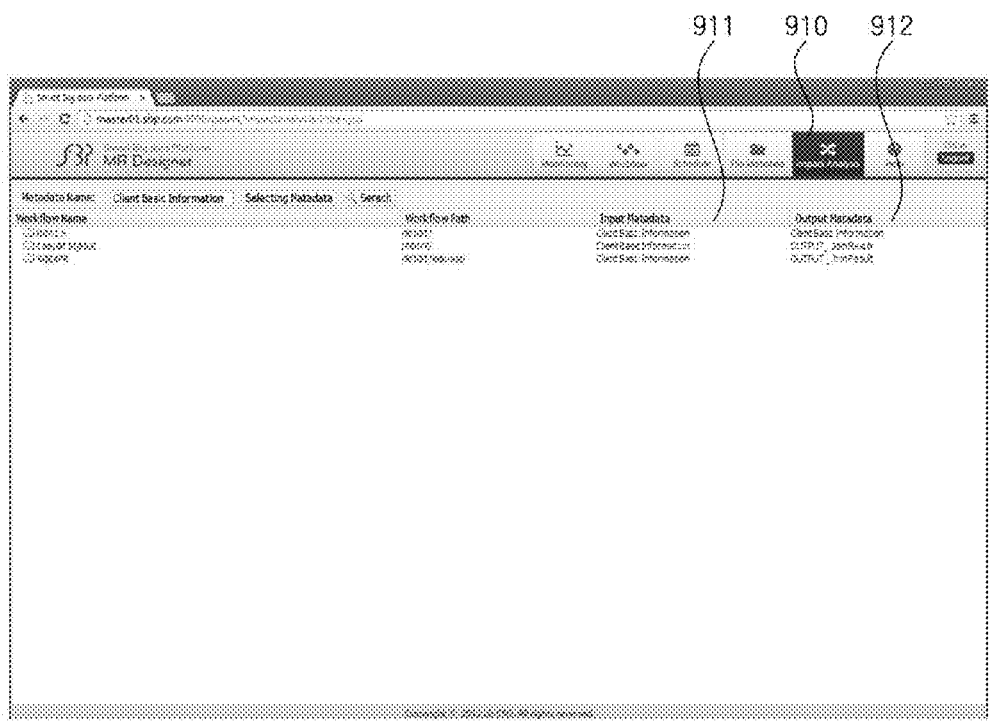
FIG. 9 is a diagram showing an effect analysis screen for the metadata of the apparatus of processing the big data in FIG. 1.

The big data processing apparatus 100 may check whether the metadata defined on the file metadata menu is changed to provide a workflow list related with the metadata changed through the effect analysis screen for the metadata when the metadata is changed. For example, in FIG. 9, when the metadata is changed, the big data processing apparatus 100 may provide at least one of a name, path, input metadata 911 or output metadata 912 for the workflow including the metadata changed through the effect analysis screen for the metadata.

As broadly described and embodied herein, a method of processing a big data may include arranging a plurality of action icons and a plurality of flow icons representing a non-cyclic order for the plurality of the action icons on a palette to generate a workflow, checking a syntax for the plurality of the arranged action icons and the plurality of the flow icons, each being dependent on a corresponding action icon and graphically generating an alarm badge indicating a syntax error for a specific icon when the syntax error for the specific icon is found.

In at least one embodiment, arranging the plurality of the action icons and the plurality of the flow icons may include checking a sequential process availability for a pair of action icons when a specific flow icon between the pair of the action icons is arranged.

Arranging the plurality of the action icons and the plurality of the flow icons may further include providing a metadata for the specific action icon from an icon window when a specific action icon in the workflow is selected and storing a sequential execution procedure for the metadata. Arranging the plurality of the action icons and the plurality of the flow icons may further include receiving a HADOOP setting parameter associated with a map-reduce operation for the specific action icon.

Arranging the plurality of the action icons and the plurality of the flow icons may further include setting an input-output location of HADOOP distribution storage associated with the map-reduce work for the specific action icon.

In at least one embodiment, a part of the plurality of the action icons may respectively include a big data process work and others thereof may respectively include a flow process work.

In at least one embodiment, checking the syntax may include checking whether an execution procedure being used in the plurality of the arranged action icons and dependent flow icons thereof is defined or available.

In at least one embodiment, graphically generating the alarm badge may further include determining a type of the syntax error for the specific icon to determine the alarm badge corresponding to the type of the syntax error.

In at least one embodiment, the method may further include adjusting a transparency for the icon window according to a movement speed of the icon window popped up for the specific icon.

In at least one embodiment, the method may further include providing process work information for the generated workflow through a work monitoring menu included in a workflow work environment.

The method may further include defining a metadata for generating the workflow for the plurality of the action icon through a file metadata menu included in the workflow work environment.

The method may further include checking whether the metadata defined on the file metadata menu is changed and providing a workflow list related with the changed metadata through an effect analysis screen for the metadata included in the workflow work environment when a change of the metadata is checked.

In at least one embodiment, the method may further include converting the workflow into a workflow definition document when a syntax check for the generated workflow is completed and storing the workflow definition document in a workflow database.

The method may further include converting the workflow definition document into an execution code and analyzing the execution code to determine an action icon and transferring the execution code for the determined action icon to a job tracker to receive whether an execution for the determined action icon is completed.

In at least one embodiment, the method may further include storing a result for a corresponding map-reduce process in a map-reduce database when a map-reduce process for the action icon is completed.

In at least one embodiment, an apparatus of processing big data includes a workflow writing unit configured to arrange a plurality of action icons and a plurality of flow icons representing a non-cyclic order for the plurality of the action icons on a palette to generate a workflow, an icon syntax checking unit configured to check a syntax for the plurality of the arranged action icons and the plurality of the flow icons, each being dependent on a corresponding action icon and an alarm badge generating unit configured to graphically generate an alarm badge indicating a syntax error for a specific icon when the syntax error for the specific icon is found.

A part of the plurality of the action icons may respectively include a big data process work and others of the plurality of the action icons may respectively include a flow process work.

In at least one embodiment, the apparatus may further include a window transparency adjusting unit configured to adjust a transparency for the icon window according to a movement speed of the icon window popped up for the specific icon.

In at least one embodiment, the apparatus may further include a workflow database storing unit configured to convert the workflow into a workflow definition document when a syntax check for the generated workflow is completed and store the workflow definition document in a workflow database.

The apparatus may further include an execution completion transferring unit configured to convert the workflow definition document into an execution code, to analyze the execution code to determine an action icon and to transfer the execution code for the determined action icon to a job tracker to receive whether an execution for the determined action icon is completed.

The apparatus may further include a map-reduce database storing unit configured to store a result for a corresponding map-reduce process in a map-reduce database when a map-reduce process for the action icon is completed.

In at least one embodiment, a machine-readable non-transitory medium storing a computer program for a method of processing big data being performed in an apparatus, the machine-readable non-transitory medium having stored thereon machine-executable instructions for arranging a plurality of action icons and a plurality of flow icons representing a non-cyclic order for the plurality of the action icons on a palette to generate a workflow, checking a syntax for the plurality of the arranged action icons and the plurality of the flow icons, each being dependent on a corresponding action icon and graphically generating an alarm badge indicating a syntax error for a specific icon when the syntax error for the specific icon is found.

Embodiments may use a HADOOP to effectively manage a workflow for processing irregular big data. An alarm badge may be provided according to a syntax error of a metadata being provided for generating a workflow. Moreover, embodiments may provide a completion time of a map-reduce process by falling for an action icon execution from a job tracker.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of processing big data, the method comprising:
   displaying, on a display, a plurality of action icons and a plurality of flow icons, the plurality of action icons and the plurality of flow icons being graphically arranged to represent a non-cyclic order for the plurality of the action icons to generate a workflow, the plurality of action icons being associated with executable functions for a framework for distributed storage and processing of big data including at least one of a distributed file system (DSF) input function, a DSF output function, an expression function, or an aggregator function, and checking a sequential process availability for a pair of action icons when a specific flow icon between the pair of action icons is arranged,
   wherein checking a sequential process availability further includes sequentially processing the workflow when all requisite action icons are arranged in the workflow between the pair of action icons, and refusing sequential process availability when all requisite action icons are not arranged in the workflow between the pair of action icons;
   checking, by a controller, a syntax for each of the plurality of the arranged action icons and the plurality of the flow icons, the syntax being dependent on an action icon for which the syntax is checked or an action icon corresponding to a flow icon for which the syntax is checked;
   generating, by the controller, an alarm badge for display on a corresponding action icon for which the alarm badge is generated, the alarm badge indicating a syntax error for the corresponding action icon for which the alarm badge is generated when the syntax error is found;

converting the workflow into a workflow definition document when a syntax check for the generated workflow is completed and storing the workflow definition document in a workflow database;

converting the workflow definition document into an execution code and analyzing the execution code to determine an action icon;

transferring the execution code for the determined action icon to a job tracker module to automatically receive a processing progress status including a completion time of the determined action icon; and providing process work information for a plurality of the generated workflow through a work monitoring menu included in a workflow work environment, wherein the process work information includes an ID, a status whether a process succeeded or failed, a start time, an end time, a generation time, and a latest change time for the generated workflow, wherein displaying the plurality of the action icons and the plurality of the flow icons further includes receiving a setting parameter for the framework for distributed storage and processing of big data associated with a map-reduce process, and wherein at least one of the plurality of the action icons is associated with a big data process and at least one of the plurality of the action icons is associated with a flow process, wherein displaying the plurality of the action icons and the plurality of the flow icons further includes providing metadata for a specific action icon from an icon window when the specific action icon in the workflow is selected, and storing a sequential execution procedure for the metadata, wherein transparency for the icon window is adjusted according to a movement speed in which an icon window is initially popped up for display based on selection of the specific action icon, wherein when the movement speed is slow the transparency is increased and when the movement speed is fast the transparency is decreased, and wherein the icon window includes
 a first window having an input metadata region and an output metadata region, the input metadata region displaying a plurality of map-reduce input items for the specific action icon associated with input metadata and the output metadata region displays a plurality of items associated with output metadata for an operation, expression and execution sequence,
 a second window that displays a configuration region for the framework including at least one key and value associated with an operation mode of the map-reduce process, and
 a third window that displays an input-output location of distribution storage, wherein displaying the plurality of the action icons and the plurality of the flow icons further includes setting the input-output location of the distribution storage associated with the map-reduce process in the third window.

2. The method of claim 1, wherein checking the syntax includes checking whether an execution procedure being used in the plurality of the arranged action icons and dependent flow icons thereof are defined or available.

3. The method of claim 1, wherein generating the alarm badge further includes determining a type of the syntax error to determine the alarm badge corresponding to a type of the syntax error.

4. The method of claim 1, further comprising:
defining metadata to be added or deleted for generating the workflow for the plurality of the action icons through a file metadata menu included in the workflow work environment, wherein the file metadata menu includes a list of a plurality of defined metadata for big data, each of the plurality of defined metadata including a name, a column explanation, a unique type, and whether a primary key is included.

5. The method of claim 4, further comprising:
checking whether the metadata defined on the file metadata menu is changed; and
providing a workflow list related to the changed metadata through an effect analysis screen for the metadata included in the workflow work environment when the metadata is determined to have changed, wherein each changed metadata listed in the workflow list includes a workflow name, a workflow path, an input metadata, and an output metadata.

6. The method of claim 1, further comprising:
storing a result for a corresponding map-reduce process in a map-reduce database when a map-reduce process for the action icon is completed.

7. The method of claim 1, wherein the icon window includes a first tab for displaying the first window, a second tab for displaying the second window, and a third tab for displaying the third window.

8. The method of claim 1, wherein generating the alarm badge for display on a corresponding action icon includes displaying a first badge for a first type of syntax error and a second badge for a second type of syntax error, wherein the first type of syntax error is different than the second type of syntax error.

9. The method of claim 8, wherein the first type of syntax error is found when a typing error or an error in value is detected and the second type of syntax error is found when a syntax is not inputted at a syntax input item of a corresponding action icon.

10. An apparatus of processing big data, the apparatus comprising:
a workflow writing unit configured to arrange a plurality of action icons and a plurality of flow icons representing a non-cyclic order for the plurality of the action icons to generate a workflow, the plurality of action icons being associated with executable functions for a framework for distributed storage and processing of big data including at least one of a distributed file system (DSF) input function, a DSF output function, an expression function, or an aggregator function, and check a sequential process availability for a pair of action icons when a specific flow icon between the pair of action icons is arranged,
wherein checking a sequential process availability further includes sequentially processing the workflow when all requisite action icons are arranged in the workflow between the pair of action icons, and refusing sequential process availability when all requisite action icons are not arranged in the workflow between the pair of action icons;
an icon syntax checking unit configured to check a syntax for each of the plurality of the arranged action icons and the plurality of the flow icons, the syntax being dependent on an action icon for which the syntax is checked or an action icon corresponding to a flow icon for which the syntax is checked;
an alarm badge generating unit configured to graphically generate an alarm badge that indicates a syntax error for the corresponding action icon for which the alarm badge is generated when the syntax error is found; and
an execution completion transferring unit configured to convert the workflow definition document into an execution code, to analyze the execution code to determine an action icon and to transfer the execution code for the determined action icon to a job tracker module to automatically receive a processing progress status including a completion time of the determined action icon,
wherein displaying the plurality of the action icons and the plurality of the flow icons further includes receiving a setting parameter for the framework for distributed storage and processing of big data associated with a map-reduce process,
wherein at least one of the plurality of the action icons is associated with a big data process and at least one of the plurality of the action icons is associated with a flow process,
wherein displaying the plurality of the action icons and the plurality of the flow icons further includes providing metadata for a specific action icon from an icon window when the specific action icon in the workflow is selected, and storing a sequential execution procedure for the metadata,
wherein transparency for the icon window is adjusted according to a movement speed in which an icon window is initially popped up for display based on selection of the specific action icon, wherein when the movement speed is slow the transparency is increased and when the movement speed is fast the transparency is decreased, and
wherein the icon window includes
 a first window having an input metadata region and an output metadata region, the input metadata region including a plurality of map-reduce input items for the specific action icon to set input metadata and the output metadata region including a plurality of items to set output metadata for an operation, expression and execution sequence,
 a second window that displays a configuration region for the framework including at least one key and value associated with an operation mode of the map-reduce process, and
 a third window that displays an input-output location of distribution storage, wherein displaying the plurality of the action icons and the plurality of the flow icons further includes setting the input-output location of the distribution storage associated with the map-reduce process in the third window, and
 wherein a work monitoring menu included in a workflow work environment displays process work information for a plurality of the generated workflow, wherein the process work information includes an ID, a status whether a process succeeded or failed, a start time, an end time, a generation time, and a latest change time for the generated workflow.

11. The apparatus of claim 10, further comprising:
a workflow database storing unit configured to convert the workflow into a workflow definition document when a syntax check for the generated workflow is completed and store the workflow definition document in a workflow database.

12. The apparatus of claim 11, further comprising:
a map-reduce database storing unit configured to store a result for a corresponding map-reduce process in a map-reduce database when a map-reduce process for the action icon is completed.

13. A machine-readable non-transitory medium storing a computer program for a method of processing a big data being performed in an apparatus of processing the big data, the machine-readable non-transitory medium having stored thereon machine-executable instructions for:
displaying, on a display, a plurality of action icons and a plurality of flow icons, the plurality of action icons and the plurality of flow icons being graphically arranged to represent a non-cyclic order for the plurality of the action icons to generate a workflow, the plurality of action icons being associated with executable functions for a framework for distributed storage and processing of big data including at least one of a distributed file system (DSF) input function, a DSF output function, an expression function, or an aggregator function, and checking a sequential process availability for a pair of action icons when a specific flow icon between the pair of action icons is arranged,
wherein checking a sequential process availability further includes sequentially processing the workflow when all requisite action icons are arranged in the workflow between the pair of action icons, and refusing sequential process availability when all requisite action icons are not arranged in the workflow between the pair of action icons;
checking, by a controller, a syntax for each of the plurality of the arranged action icons and the plurality of the flow icons, the syntax being dependent on an action icon for which the syntax is checked or an action icon corresponding to a flow icon for which the syntax is checked;
generating, by the controller, an alarm badge for display on a corresponding action icon for which the alarm badge is generated, the alarm badge indicating a syntax error for the corresponding action icon for which the alarm badge is generated when the syntax error is found;
converting the workflow into a workflow definition document when a syntax check for the generated workflow is completed and storing the workflow definition document in a workflow database;
converting the workflow definition document into an execution code and analyzing the execution code to determine an action icon;
transferring the execution code for the determined action icon to a job tracker module to automatically receive a processing progress status including a completion time of the determined action icon; and
providing process work information for a plurality of the generated workflow through a work monitoring menu included in a workflow work environment, wherein the process work information includes an ID, a status whether a process succeeded or failed, a start time, an end time, a generation time, and a latest change time for the generated workflow,
wherein displaying the plurality of the action icons and the plurality of the flow icons further includes receiving a setting parameter for the framework for distributed storage and processing of big data associated with a map-reduce process, wherein at least one of the plurality of the action icons is associated with a big data process and at least one of the plurality of the action icons is associated with a flow process, wherein displaying the plurality of the action icons and the plurality of the flow icons further includes providing metadata for a specific action icon from an icon window when the specific action icon in the workflow is selected, and storing a sequential execution procedure for the metadata, wherein transparency for the icon window is adjusted according to a movement speed in which an icon window is initially popped up for display based on selection of the specific action icon, wherein when the movement speed is slow the transparency is increased and when the movement speed is fast the transparency is decreased, and wherein the icon window includes
a first window having an input metadata region and an output metadata region, the input metadata region including a plurality of map-reduce input items for the specific action icon associated with input metadata and the output metadata region including a plurality of items associated with output metadata for an operation, expression and execution sequence,
a second window that displays a configuration region for the framework including at least one key and value associated with an operation mode of the map-reduce process, and
a third window that displays an input-output location of distribution storage, wherein displaying the plurality of the action icons and the plurality of the flow icons further includes setting the input-output location of the distribution storage associated with the map-reduce process in the third window.

* * * * *